April 4, 1961  A. R. HEAP  2,978,528
CHARGED ACCUMULATOR PLATES IN A CONTINUOUS OPERATION
Filed Feb. 13, 1957  2 Sheets-Sheet 1
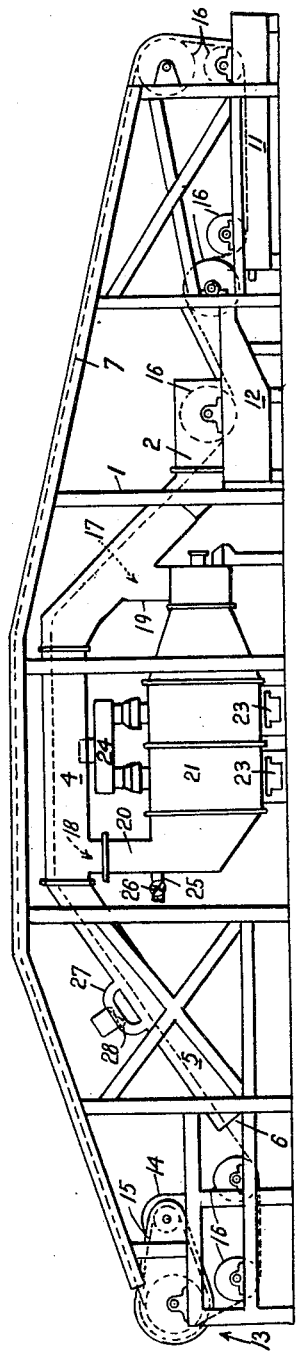
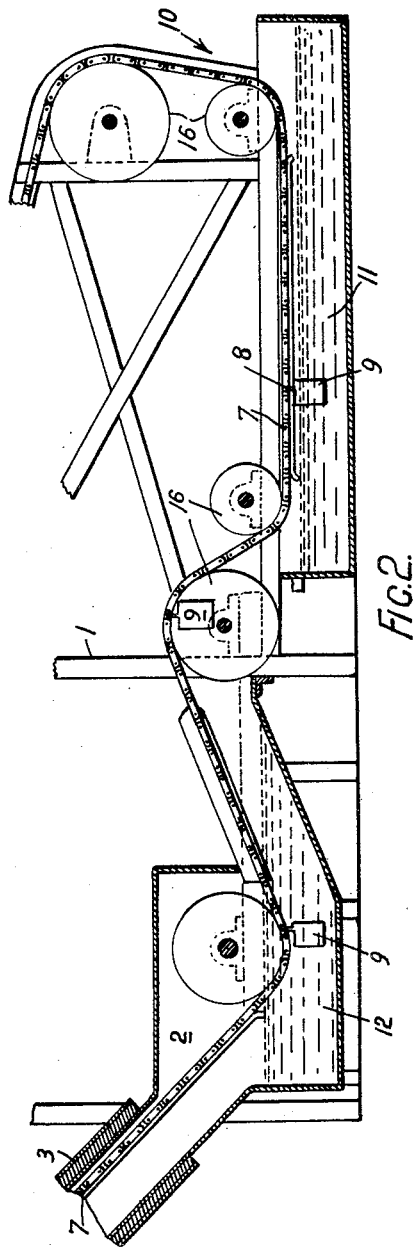
INVENTOR
ALAN R HEAP

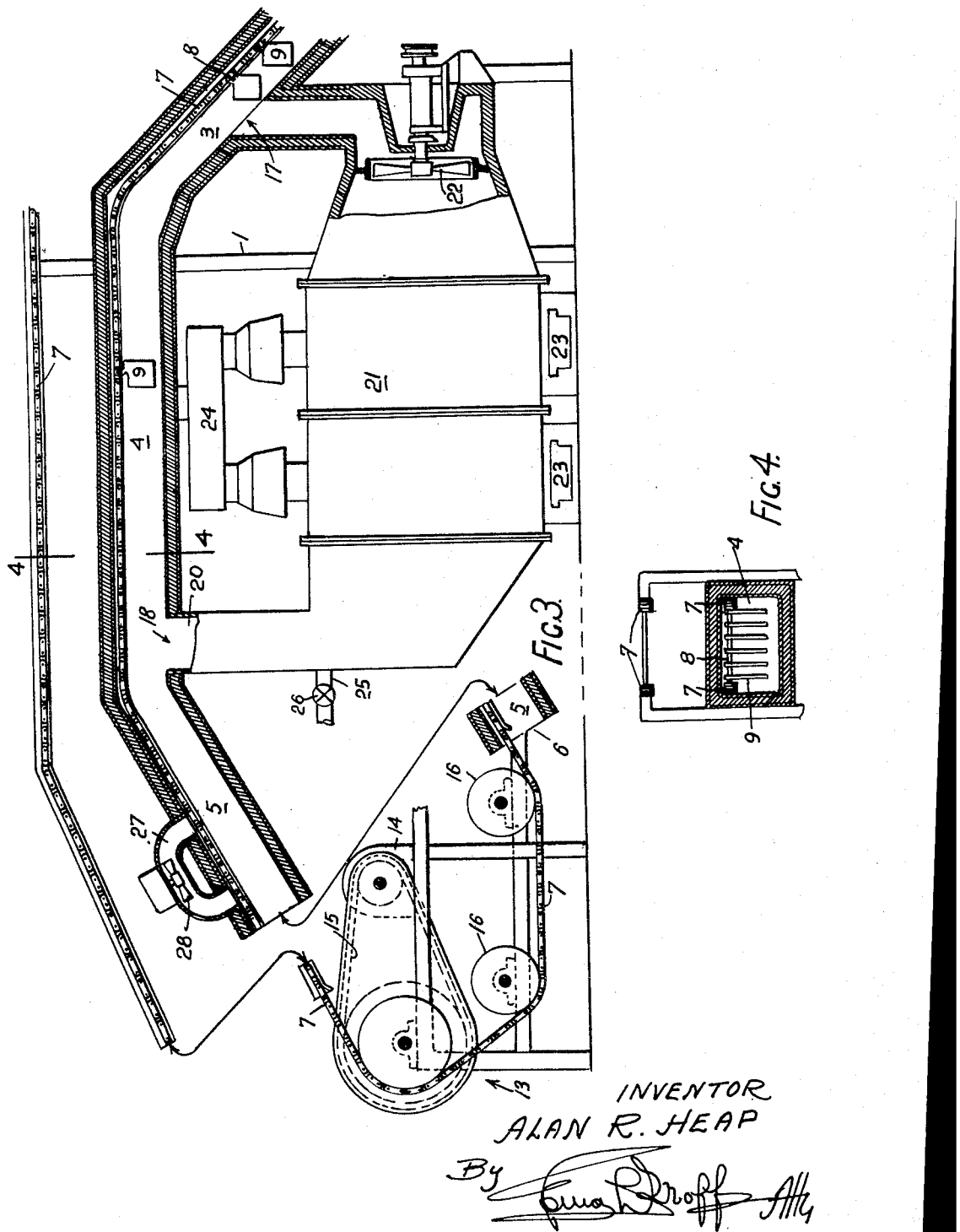

United States Patent Office 2,978,528
Patented Apr. 4, 1961

2,978,528
CHARGED ACCUMULATOR PLATES IN A CONTINUOUS OPERATION

Alan Robert Heap, Auburn, near Sydney, New South Wales, Australia, assignor to Clyde Batteries Pty. Limited, Granville, near Sydney, New South Wales, Australia, a company of New South Wales, Australia Filed Feb. 13, 1957, Ser. No. 639,969

Claims priority, application Australia Feb. 13, 1956

8 Claims. (Cl. 136—33)

This invention relates to the manufacture of dry charged accumulators which can be stored in such condition and made ready for immediate use by filling with electrolyte.

In the manufacture of such batteries it is essential to remove all moisture from the plates in order to prevent oxidation. Where the drying operation is carried out by the application of heat it is necessary to cool the plates after drying and before exposing to an oxidising atmosphere in order to prevent spontaneous combustion of the sponge lead therein.

Hitherto in one method of drying the plates a drying oven has been employed. Batches of plates are placed in the oven and the plates dried therein with an inert hot gas. Subsequently the plates are cooled in the oven before being exposed to an oxidising atmosphere. The method is not economical because of the necessity to alternately heat and cool the oven and to exhaust oxygen therefrom prior to each heating operation; the method and means of the present invention overcome these economical difficulties.

The method of the present invention consists of conveying the plates in a continuous operation through a drying chamber having an entrance sealed against the inlet of air and wherein one part moisture is extracted from the plates and converted to super-heated steam by a heating medium which is circulated through the plates in the moisture extracting operation. In another part of the drying chamber steam dried by the heating medium but not there subjected to heating is caused to flow about the plates as an inert cooling medium. The cooling medium passes through the outlet of the drying chamber with the plates and prevents the inflow of oxygen to the drying chamber. Steam from an external source is admitted to initiate the drying operation and to initially purge the drying chamber of oxygen, and if necessary to compensate for any deficiency in the volume of steam required to carry out the method.

Apart from the steam required for the purging operation the steam generated from the moisture in the plates is generally sufficient to keep the drying chamber fully effective. As the drying chamber is at all working time charged with steam at slightly above atmosphere pressure there is no tendency or likelihood of oxygen entering the chamber.

The means for carrying out the method consists of a tunnel like chamber having one part constituting a high temperature zone and another part constituting a cooling zone. Means are included to circulate a heating mechanism through the high temperature zone. The entrance of the tunnel is sealed against the inlet of air. A conveyor for plates passes through the tunnel.

Preferred means for carrying invention into effect are described with reference to the annexed drawings wherein:

Fig. 1 is a side elevation of the means.

Fig. 2 is a side sectional elevation of the fore end of the means showing the washing tank, the water seal and part of the conveyor.

Fig. 3 is an enlarged side elevation partly in section of the heating tunnel and the delivery end of the means showing also the heating unit.

Fig. 4 is a cross section of Fig. 3.

A framing designated generally by the reference 1 supports a tunnel like chamber of hump formation. That is to say from the inlet 2 the tunnel rises upwardly obliquely as at 3 and is joined at the top by a horizontal part 4 while the rear part is set downwardly obliquely as at 5 to an outlet 6.

An endless conveyor 7 having hooks 8 or the like on which accumulator plates—indicated at 9—can be suspended extends from a loading position—indicated by the arrow 10—through a washing tank 11 (where acid is removed from the plates) then upwardly out of the washing tank and downwardly over change of direction pulleys and through a water seal tank 12 into which the inlet 2 to the tunnel projects. The conveyor then passes through the tunnel to an unloading position—indicated by the arrow 13—and from this position it returns through the frame to the start position. The conveyor is actuated by motor 14 and belt or chain 15. Some of the change of direction pulleys are shown and indicated by the reference 16.

The parts 3 and 4 of the tunnel constitute the high temperature zone. There is an inlet 17 to this zone in part 3 and an outlet 18 from part 4. Ducts 19—20 from the inlet and outlet respectively are connected to a heat exchanger 21. A circulating fan 22 is located in the heat exchanger adjacent to the inlet duct 19. It is arranged to circulate steam through the heat exchanger and the high temperature zone of the tunnel. Steam can also flow through part 5 of the tunnel to the outlet 6. Heating means for the heat exchanger are indicated at 23 and a flue outlet is indicated 24.

There is a steam inlet 25 to the heat exchanger from an external supply with a control valve 26 thereon. A thermostat and means actuated thereby is provided to actuate the control valve. Hand actuating means are also provided. In addition there is a thermostat control for the heating medium used in the heat exchanger. Another thermostat control is provided to ensure that the temperature of the plates does not exceed a determined limit. These thermostat controls are conventional.

Plates 9 to be dried are hooked on to the conveyor at the loading position 10. They are conveyed through the washing tank 11, through the water seal 12 and through the tunnel which has been purged of oxygen as aforesaid. In the high temperature zone the plates are subjected to the heating medium which is circulated through the zone and about the plates by the fan 22. Moisture extracted by the heating medium is converted into superheated steam. While a quantity of the steam is drawn into and through the heat exchanger 21 by the fan 22 sufficient steam is provided either by extraction from the plates or from an external source admitted through the valve 25 to fill part 5 of the tunnel and flow from the outlet 6. The steam in the part 5 functions as a sufficient cooling medium to reduce the temperature of the dried plates to the degree necessary to avoid likelihood of damage thereto.

Means may be incorporated to increase the circulation of the cooling medium about the plates. For this purpose a circulating duct 27 is incorporated in part 5 of the tunnel. A fan 28 in this duct creates a flow of the cooling medium about the plates as shown by the arrow 29. This flow is arranged so that it does not completely block the flow of the cooling medium through the outlet 6.

The plates 9 can be suspended individually from hooks on the conveyor or in groups constituting the assembly of a battery element. It will be appreciated that the invention is particularly applicable to the drying of charged negative plates.

I claim:

1. Apparatus for drying charged accumulator plates including a tunnel-like chamber having an inlet and an outlet, a central portion of said chamber being relatively elevated with respect to said inlet and outlet, a heat exchanger, means defining an inlet and outlet communication between said heat exchanger and said elevated portion of said chamber and the portion adjacent said chamber inlet, a fan for recirculating a heating medium through said heat exchanger, said relatively elevated portion of said chamber and the chamber portion adjacent said inlet, means for introducing steam from an external source to said heat exchanger and the portion of said chamber extending from said elevated portion to the chamber outlet, a fan in said outlet portion of said chamber for maintaining circulation of the steam from said external source to provide a cooling medium therein, means sealing the chamber inlet against entrance of air therethrough, a motor actuated endless conveyer means for moving accumulator plates through said sealing means and said chamber to be stripped of moisture as they pass through said relatively elevated portion of said chamber and be cooled prior to exit from said chamber through said outlet.

2. A method of drying charged accumulator plates employing a drying chamber having an inlet and an outlet and a seal to prevent flow of air into said chamber through said inlet, consisting of the steps of purging said chamber, continuously moving the plates in and through said drying chamber from the inlet to the outlet, flowing a heating medium past the moving plates in one part of said chamber adjacent the inlet, stripping the moisture therefrom and converting it to steam, superheating and recirculating at least a portion of the steam past the moving plates to dry them, flowing an inert cooling medium over the moving plates in another portion of the chamber adjacent its outlet and moving the plates through the chamber outlet in a flow of the inert cooling medium which prevents inflow of air to said chamber.

3. A method of drying charged accumulator plates employing a unit chamber having an inlet and an outlet including the steps of purging the chamber of oxygen, moving the plates in continuous fashion into and through the chamber, initiating and maintaining a re-circulating flow of superheated steam in one portion of the chamber adjacent the inlet to strip the moisture from the moving plates, maintaining a flow of steam at a cooling temperature over the moving plates within the other portion of the chamber adjacent the outlet to cool the plates and flowing the cooling steam through the chamber outlet with the moving plates to prevent inflow of air to the chamber.

4. A system of drying charged accumulator plates employing a unit chamber having an inlet and an outlet including the steps of sealing the chamber inlet against entrance of oxygen, purging the chamber of oxygen, continuously moving accumulator plates into and through the chamber, initiating and circulating a flow of superheated steam in one portion of said chamber adjacent its inlet, stripping the moisture from the moving plates and converting it to steam, superheating the converted moisture and recirculating it past the plates in said one portion of the chamber to dry them and flowing a portion of the converted moisture into another portion of the chamber adjacent its outlet and circulating this steam about the moving plates as they move to and through the chamber and flowing this cooling steam through the chamber outlet to prevent inflow of air to said chamber outlet to cool them prior to exit from the chamber.

5. Apparatus for drying charged accumulator plates consisting of a tunnel-like chamber having an inlet and an outlet, means providing a fluid seal at the chamber inlet preventing inflow of air to said chamber, conveyer means for continuously moving accumulator plates through the seal, into and through said chamber, means for continuously flowing a drying medium through the portion of said chamber adjacent said inlet to strip moisture from the moving plates and convert it to steam, means for superheating the steam and recirculating it past the moving plates in said one portion of said chamber and means for circulating an inert cooling medium about the moving plates in another portion of the chamber and prevent inflow of air to said chamber through said outlet adjacent its outlet to cool the plates prior to their exit from the chamber.

6. Apparatus for drying charged accumulator plates consisting of a tunnel-like chamber having an inlet and an outlet, one part of said chamber providing a high temperature section and another part providing a cooling section, means to superheat and continuously recirculate a drying medium through said high temperature section, an endless conveyer having means for carrying accumulator plates successively through said high temperature and cooling sections from said inlet to said outlet, means for moving said conveyer through said chamber, means for maintaining a pressured flow of a cooling medium in said cooling section and through said outlet to prevent entrance of air to said chamber through said outlet and fluid means sealing the inlet to said chamber against introduction of air.

7. Apparatus for drying charged accumulator plates consisting of a tunnel-like chamber having an inlet and an outlet, said chamber being formed to rise upwardly obliquely from its inlet to an intermediate horizontal section and together therewith form an evaporating section and extend downwardly obliquely from said horizontal section to said outlet, a heat exchanger, an inlet from said heat exchanger to said evaporating section of said chamber and an outlet from said evaporating section to said heat exchanger, means operatively connected with said heat exchanger and said evaporating section to continuously recirculate a super-heated evaporating medium in said evaporating section, means defining a seal of the inlet to said chamber preventing intake of air therethrough, an endless conveyer arranged to move the plates through said seal means and progressively through said chamber for evaporating of moisture therefrom in said evaporating section and cooling prior to exit from said chamber through said outlet and means communicating with said chamber for inducing a continuing flow of cooling medium therein subsequent to said evaporator section and preventing the entrance of oxygen to said chamber through said outlet.

8. Apparatus for drying charged accumulator plates including a drying chamber having an inlet and an outlet opening, seal means for the inlet preventing flow of air into said chamber, means for moving accumulator plates in and continuously through said chamber from the inlet to the outlet, means for continuously flowing a superheated drying medium past the moving plates in one part of the chamber adjacent the inlet, means in said chamber for flowing a cooling medium outwardly through said outlet over the plates as they move adjacent and pass therethrough to cool the plates and prevent flow of air into said chamber through said outlet opening.

References Cited in the file of this patent

UNITED STATES PATENTS

| | | |
|---|---|---|
| 890,314 | Thompson | June 9, 1908 |
| 1,566,275 | Harrison | Dec. 22, 1925 |
| 1,806,180 | Reinhardt | May 19, 1931 |
| 2,028,759 | Dinley | Jan. 28, 1936 |
| 2,389,894 | Chubb et al. | Nov. 27, 1945 |
| 2,689,198 | Judd | Sept. 14, 1954 |

FOREIGN PATENTS

| | | |
|---|---|---|
| 184,658 | Great Britain | Aug. 12, 1922 |

OTHER REFERENCES

Vinal: Storage Batteries, John Wiley and Sons, 4th ed., 1955, page 41.